(Model.)

2 Sheets—Sheet 1.

C. R. JOHNSON.
CIRCULAR SAWING MACHINE.

No. 306,622.   Patented Oct. 14, 1884.

Witnesses.
L. F. Gardner
J. W. Garner

Inventor.
C. R. Johnson,
per
F. A. Lehmann, Att'y.

N. PETERS, Photo-Lithographer, Washington, D. C.

(Model.)

C. R. JOHNSON.
CIRCULAR SAWING MACHINE.

No. 306,622. Patented Oct. 14, 1884.

2 Sheets—Sheet 2.

Witnesses.
L. F. Gardner
J. W. Garner

Inventor.
C. R. Johnson,
per
F. A. Lehmann,
Atty

UNITED STATES PATENT OFFICE.

CHARLES RILEY JOHNSON, OF ST. MARY'S, OHIO.

CIRCULAR SAWING MACHINE.

SPECIFICATION forming part of Letters Patent No. 306,622, dated October 14, 1884.

Application filed June 23, 1884. (Model.)

*To all whom it may concern:*

Be it known that I, CHARLES R. JOHNSON, of St. Mary's, in the county of Auglaize and State of Ohio, have invented certain new and useful Improvements in Machines for Shaping Oars, &c.; and I do hereby declare the following to be a full, clear, and exact description of the invention, such as will enable others skilled in the art to which it pertains to make and use it, reference being had to the accompanying drawings, which form part of this specification.

My invention relates to an improvement in machines for reblading oars and sculls; and it consists, first, in the combination of a suitable saw with two adjustable guides, which are arranged in front of the saw, with suitable springs for supporting the oar in position while being operated upon by the saw; second, in the combination of a suitable saw, adjustable guides arranged in front of the saw, spring devices for supporting the blades in position while being operated upon by the saw, with a flexible wood or metal form, which is used more especially to assist the operator in reblading long and heavy oars; third, in the arrangement and combination of devices, which will be more fully described hereinafter.

The object of my invention is to provide a machine by means of which an oar can be rebladed readily and easily and the expense of making the oars greatly reduced.

Figure 1:
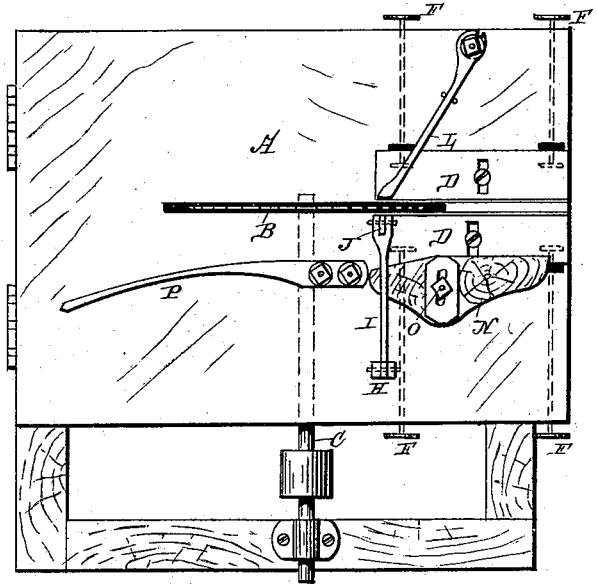
Figure 2:
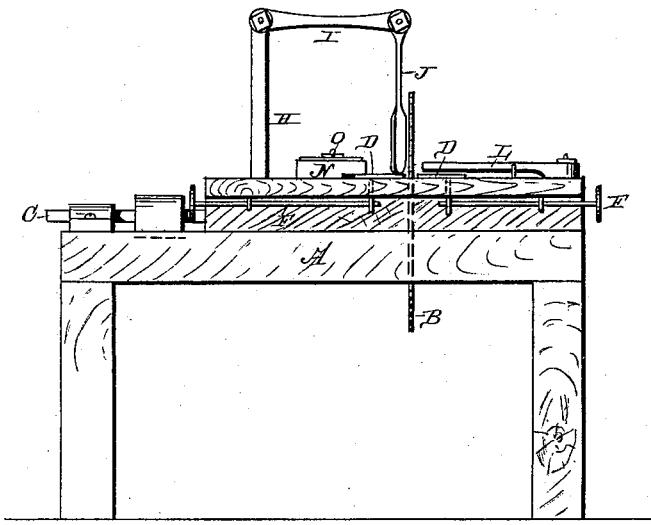
Figure 3:
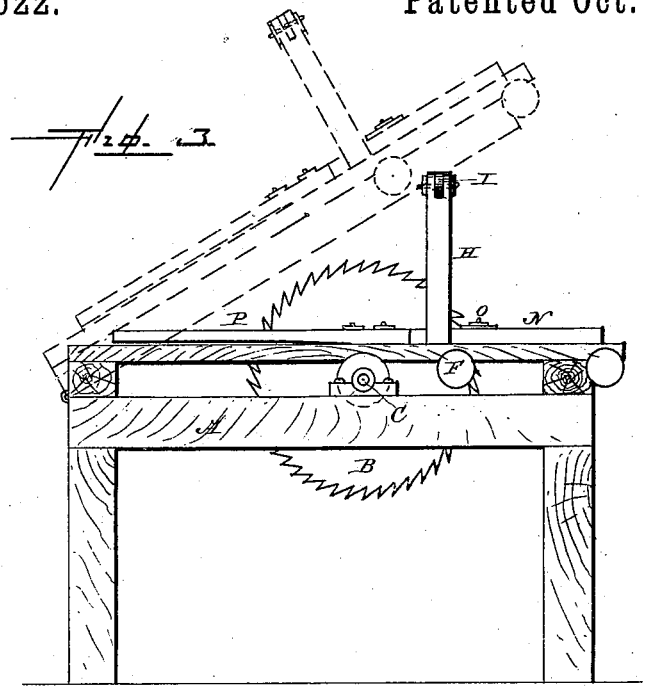
Figure 4:
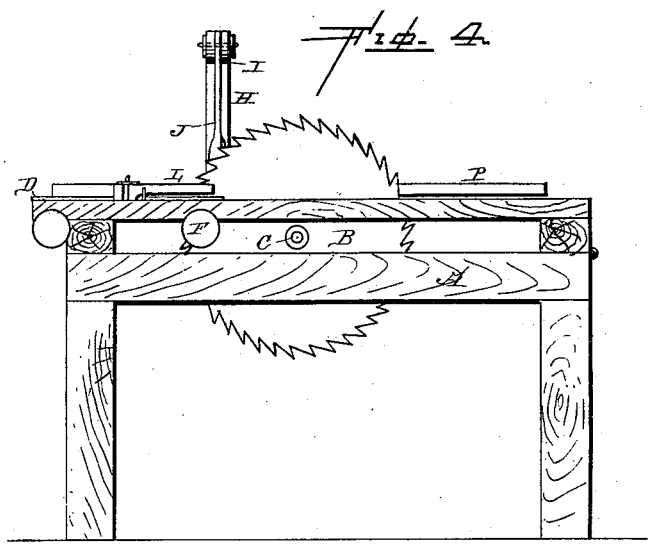

Figure 1 is a plan view of a machine embodying my invention. Fig. 2 is an end view of the same. Figs. 3 and 4 are side elevations taken from opposite sides.

A represents a suitable table or frame-work, and B a circular saw, which is secured to the shaft C. Upon the top of the table, which is hinged to its frame so that it can be raised back from the saw in the usual manner, are the two metallic plates D, the inner edges of which overlap the front edge of the saw, and which plates form guides for the oar while being operated upon by the saw. Each one of these guides is adjusted laterally upon the table by means of two sets of screws, F, so that they can be moved any desired distance apart. Between the inner edges of these two guides the oar is held and guided in its movement toward the saw. To one side of the saw is placed the standard H, and to the upper end of this standard is pivoted the arm, brace, or support I. In the outer end of this arm, brace, or support I is pivoted the spring J, which projects down beside the saw, and which serves to support the oar while it is being operated upon. Upon the opposite side of the saw a spring, L, is secured to the table, and which has its inner end projecting inwardly close to the saw, for the purpose of holding the oar upon that side.

Clamped upon the top of the table in any desired relation to the saw and to the two parallel guides is a gage, N, which is slotted so that it can be adjusted laterally, and which is held in position by means of a clamping-bolt, O. This gage is for the purpose of regulating the width that the oar shall be sawed. Also adjustably fastened to the top of the table, at the inner end of this gage N, and opposite the saw, is a flexible wooden or metal form, P, which is intended more especially to assist the operator in handling heavy and long oars. By keeping the edge of the blade to this form P the operator is enabled to give the oar the proper shape at the neck.

In operation the width of the neck is first regulated by the adjustable gage for that purpose. The two parallel adjustable gages are then regulated so that their inner edges come within any desired distance of each other, and then the oar which is to be rebladed has its edges placed between these two guides, and it is then pushed toward the saw. Two of the bevels upon opposite sides are cut while the oar is inclined toward one side of the saw, and the other two bevels upon opposite sides are cut while the oar is inclined toward the opposite side of the saw.

The supporting-springs, in connection with the two parallel guides, serve to support the oar in a proper position.

Having thus described my invention, I claim—

1. In a machine for shaping oar-blades, the combination of the table or frame, the saw, the two parallel guides, which are adjustably secured to the table in a line with the saw, and the two springs placed upon opposite sides of the saw, near its cutting-edge, substantially as shown.

2. In a machine for shaping oar-blades, the combination of the table or frame, the saw, the two parallel guides adjustably attached to the table in a line with the saw, and the bent flexible form secured to the table opposite to and extending in a line with the saw, substantially as described.

3. In a machine for shaping oar-blades, the combination of the table or frame, the saw, the two adjustable parallel guides attached to the table in a line with the saw, the two springs secured to the table on opposite sides of the saw, near its front edge, and the flexible form, which is secured to the table opposite to the saw, substantially as shown.

In testimony whereof I affix my signature in presence of two witnesses.

CHARLES RILEY JOHNSON.

Witnesses:
    LEWIS W. SCHENK,
    GEO. E. CROUT.